United States Patent
Jeon et al.

(10) Patent No.: US 10,306,686 B2
(45) Date of Patent: May 28, 2019

(54) METHOD AND APPARATUS FOR DISCOVERING A PRIMARY DEVICE OF ELECTRIC VEHICLE SUPPLY EQUIPMENT AND OPERATING METHOD OF SUPPLY EQUIPMENT COMMUNICATION CONTROLLER

(71) Applicant: Hyundai Motor Company, Seoul (KR)

(72) Inventors: Byung Seung Jeon, Gyeonggi-Do (KR); Zeung Il Kim, Gyeonggi-Do (KR); Jae Yong Seong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 15/352,900

(22) Filed: Nov. 16, 2016

(65) Prior Publication Data
US 2017/0164179 A1 Jun. 8, 2017

(30) Foreign Application Priority Data
Dec. 8, 2015 (KR) .......................... 10-2015-0174083

(51) Int. Cl.
 *H04W 40/24* (2009.01)
 *H04L 29/08* (2006.01)
 *H04W 8/00* (2009.01)
 *H04W 76/11* (2018.01)
 *H04W 4/04* (2009.01)

(52) U.S. Cl.
 CPC ............. *H04W 76/11* (2018.02); *H04L 67/12* (2013.01); *H04W 4/046* (2013.01); *H04W 40/244* (2013.01)

(58) Field of Classification Search
 CPC .......................... H04W 76/021; H04W 4/046; H04W 40/244; H04L 67/12
 See application file for complete search history.

(56) References Cited

U.S. PATENT DOCUMENTS

| | | | | |
|---|---|---|---|---|
| 9,925,886 | B2 * | 3/2018 | Halker | ................ B60L 11/1827 |
| 2015/0119035 | A1 * | 4/2015 | Ganu | .................... H04W 36/30 |
| | | | | 455/436 |
| 2016/0264011 | A1 * | 9/2016 | Yasukawa | .............. G06Q 30/06 |

* cited by examiner

*Primary Examiner* — Yemane Mesfin
*Assistant Examiner* — Henry Baron
(74) *Attorney, Agent, or Firm* — Mintz Levin Cohn Ferris Glovsky and Popeo, P.C.; Peter F. Corless

(57) ABSTRACT

A method performed by a discovery apparatus of EV includes: receiving a first transmit signal including a first network identifier from a supply equipment communication controller (SECC) of a charging station into which the EV enters and a plurality of PDs which are managed by the SECC and respectively located in positions corresponding to a plurality of charging spots of the charging station; transmitting a first connection request signal based on the first network identifier to the SECC; configuring a first wireless network with the SECC; receiving information relating to second network identifiers for the plurality of PDs from the SECC through the first wireless network; receiving second transmit signals including the second network identifiers from the plurality of PDs; selecting a specific PD among the plurality of PDs based on received signal strengths of the second transmit signals; and configuring a second wireless network with the specific PD.

12 Claims, 9 Drawing Sheets

METHOD AND APPARATUS FOR DISCOVERING A PRIMARY DEVICE OF ELECTRIC VEHICLE SUPPLY EQUIPMENT AND OPERATING METHOD OF SUPPLY EQUIPMENT COMMUNICATION CONTROLLER

CROSS-REFERENCE TO RELATED APPLICATION

This application claims the benefit of and priority to Korean Patent Application No. 2015-0174083 filed on Dec. 8, 2015 in the Korean Intellectual Property Office (KIPO), the entire contents of which are hereby incorporated by reference as if fully set forth herein.

TECHNICAL FIELD

The present disclosure relates generally to technologies for discovering charging spots for plug-in electric vehicles, and more particularly, to methods of discovering a specific primary device among a plurality of primary devices in a charging station, performed by an electric vehicle, apparatuses for the same, and operation methods of a supply equipment communication method.

BACKGROUND

An electric vehicle charging system may be defined as a system for charging a battery of an electric vehicle using power obtained from a commercial power grid or an energy storage system. The electric vehicle charging system may assume various forms according to varying types of electric vehicles. For instance, the electric vehicle (EV) may also be referred to as an electric car, an electric automobile, or a plug-in vehicle (xEV). The xEV may be classified as a plug-in all-electric vehicle or a battery electric vehicle (BEV), a plug-in electric vehicle (PEV), or a plug-in hybrid electric vehicle (PHEV).

In a case that a battery of an EV requires charging, the EV may attempt to discover a proper charging station or charging spot on its driving path. That is, the EV may attempt to discover a primary device comprising a primary coil corresponding to the charging spot or a supply equipment communication controller (SECC) of an electric vehicle supply equipment (EVSE) managing the primary device.

Also, an electric vehicle communication controller (EVCC) installed in the EV may setup communications with the SECC for the discovery of the charging sport, configuration of communications, charging of the battery, and the like. As such, the communication setup between the EVCC and the SECC may be performed using various conventional methods. For example, the communications between the EVCC and the SECC may be configured using a wide area communication network (WAN), a local area network (LAN), or a home area network (HAN), as illustrated in FIG. 1.

The EV may also have various communication interfaces, e.g., A, B, C, D, E, and F. The interfaces are located between the EV and the EVSE, a base station, the HAN, or a user mobile terminal, between the EVSE and the HAN, or between the EVSE and an end user measurement device (EUMD). In either case, the EV may be connected to an EVSE management system, an energy service provider system (ESPS), a billing service provider system (BSPS), a load management system (LMS), or a customer emergency medical service system.

Meanwhile, in order to charge the battery of the EV, the EVCC of the EV may discover a specific primary device which is the most suitable to the EV among a plurality of primary devices connected to at least one SECC in a charging station. The EV may then perform the charging of the battery after parking the EV and/or aligning the EV with the charging station.

However, while it is relatively easy for the EV to discover a SECC managing a plurality of charging spots, a means for the EV to automate its charging processes has not yet been introduced. As an example, user convenience can be maximized by enabling the EV to automatically discover a specific charging spot among a plurality of charging spots which are respectively located in parking bays.

SUMMARY

Accordingly, embodiments of the present disclosure are provided to substantially obviate one or more problems due to limitations and disadvantages of the related art. Embodiments of the present disclosure provide methods and apparatuses for discovering a primary device of an EVSE, which can easily configure initial communications between an EV and a specific primary device when discovering a specific charging spot in an EV charging system. Embodiments of the present disclosure also provide operation methods of a communication controller of an EVSE, which can easily configure wireless communications with an EV communication controller enabling an EV entering into a charging station to discover a specific charging spot.

In order to achieve the above-described objective, embodiments of the present disclosure provide a method for discovering a specific primary device (PD) of an electric vehicle supply equipment (EVSE), performed by a discovery apparatus of an electric vehicle (EV) including an electric vehicle communication controller (EVCC). The method includes: receiving a first transmit signal including a first network identifier from at least one of a supply equipment communication controller (SECC) of a charging station into which the EV enters and a plurality of PDs which are managed by the SECC and respectively located in positions corresponding to a plurality of charging spots of the charging station; transmitting a first connection request signal based on the first network identifier to the SECC; after receiving a first response to the first connection request signal from the SECC, configuring a first wireless network with the SECC; receiving information relating to second network identifiers for the plurality of PDs from the SECC through the first wireless network; receiving second transmit signals including the second network identifiers from the plurality of PDs when the first wireless network is released; selecting a specific PD among the plurality of PDs based on received signal strengths of the second transmit signals; and configuring a second wireless network with the specific PD.

Furthermore, in order to achieve the above-described objective, embodiments of the present disclosure provide an apparatus for discovering a primary device (PD) of an electric vehicle supply equipment (EVSE), which is installed in an electric vehicle (EV). The apparatus includes: a communication part communicating with a supply equipment communication controller (SECC) of a charging station into which the EV enters; and a control part controlling the communication part. The control part is configured to: receive a first transmit signal including a first network identifier from at least one of a supply equipment communication controller (SECC) of the charging station and a plurality of PDs which are managed by the SECC and are respectively located in positions corresponding to a plurality of charging spots of the charging station; transmit, to the SECC, a first connection request signal based on the first network identifier; after receiving a first response to the first connection request signal from the SECC, configure a first wireless network with the SECC; receive information relating to second network identifiers for the plurality of PDs from the SECC through the first wireless network; receive second transmit signals including the second network identifiers from the plurality of PDs when the first wireless network is released; select a specific PD among the plurality of PDs based on received signal strengths of the second transmit signals; and configure a second wireless network with the specific PD.

Furthermore, in order to achieve the above-described objective, embodiments of the present disclosure provide an operation method of a supply equipment communication controller (SECC) of an electric vehicle supply equipment (EVSE). The method includes: transmitting a signal including a first network identifier through an antenna connected to the SECC or at least one antenna connected to at least one of a plurality of primary devices (PDs) managed by the SECC; receiving a first connection request signal including the first network identifier from an electric vehicle communication controller (EVCC) of an electric vehicle (EV); after receiving the first connection request signal, configuring a first wireless network with the EVCC; providing the EVCC with information relating to second network identifiers of the plurality of PDs through the first wireless network; changing operation modes of the plurality of PDs from a first operation mode based on the first network identifier to a second operation mode based on the second network identifiers; transmitting signals including the second network identifiers respectively through antennas connected to the plurality of PDs; receiving, from the EVCC, a second connection request signal including a second network identifier of a specific PD among the plurality of PDs; and after receiving the second connection request signal, configuring a second wireless network between the specific PD and the EVCC.

Using the above-described primary device discovery methods, apparatuses, and SECC operation methods according to embodiments of the present disclosure, an EV entering into a charging station can automatically configure initial communications with a specific primary device or an SECC managing the specific primary device without intervention of a user, thereby enhancing automation and efficiency of a charging process for a battery of the EV, and enhancing convenience of the user.

Also, since a specific primary device can be easily discovered by an EVCC, a plurality of EVs entering into a parking area having a limited number of parking bays can configure initial communications with suitable primary devices among primary devices which are respectively located in the parking bays, allowing charging processes for the EVs to be performed efficiently and user convenience to be enhanced.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION OF THE EMBODIMENTS

Figure 1:
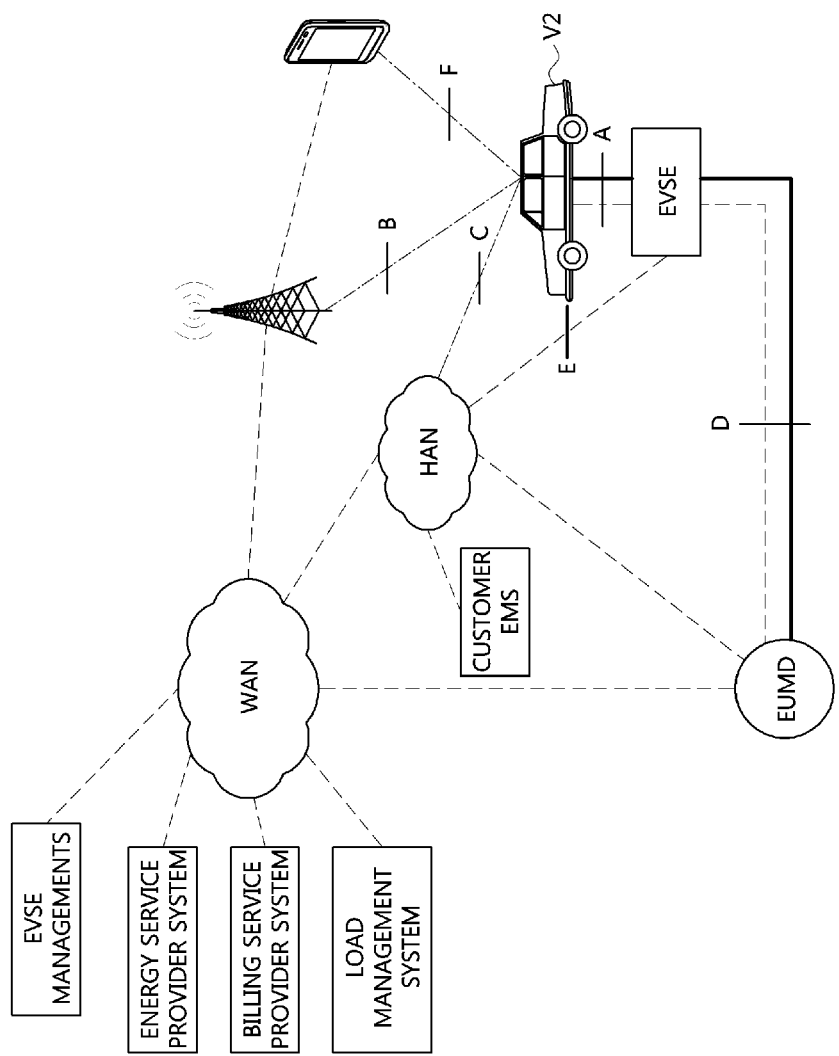
FIG. 1 is an exemplary view explaining communication interfaces between an electric vehicle and an external apparatus in a conventional electric vehicle charging system.

Embodiments of the present disclosure are disclosed herein. Specific structural and functional details disclosed herein are merely representative for purposes of describing embodiments of the present disclosure. Therefore, embodiments of the present disclosure may be embodied in many alternate forms and should not be construed as limited to embodiments of the present disclosure set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one control part. The term "control part" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control part in conjunction with one or more other components, as would be appreciated by a person of ordinary skill in the art.

Terms used in the present disclosure are defined as follows.

'Electric Vehicle, EV': An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

'Plug-in Electric Vehicle, PEV': An Electric Vehicle that recharges the on-vehicle primary battery by connecting to the power grid.

'Plug-in vehicle, PV': An electric vehicle rechargeable through wireless charging from an electric vehicle supply equipment (EVSE) without using a physical plug or a physical socket.

'Heavy duty vehicle; H.D. Vehicle': Any four-or more wheeled vehicle as defined in 49 CFR 523.6 or 49 CFR 37.3 (bus).

'Light duty plug-in electric vehicle': A three or four-wheeled vehicle propelled by an electric motor drawing current from a rechargeable storage battery or other energy devices for use primarily on public streets, roads and highways and rated at less than 4,545 kg gross vehicle weight.

'Wireless power charging system, WCS': The system for wireless power transfer and control between the GA and VA including alignment and communications. This system transfers energy from the electric supply network to the electric vehicle electromagnetically through a two-part loosely coupled transformer.

'Wireless power transfer, WPT': The transfer of electrical power from the AC supply network to the electric vehicle by contactless means.

'Utility': A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

'Smart charging': A system in which EVSE and/or PEV communicate with power grid in order to optimize charging ratio or discharging ratio of EV by reflecting capacity of the power grid or expense of use.

'Automatic charging': A procedure in which inductive charging is automatically performed after a vehicle is located in a proper position corresponding to a primary charger assembly that can transfer power. The automatic charging may be performed after obtaining necessary authentication and right.

'Interoperability': A state in which component of a system interwork with corresponding components of the system in order to perform operations aimed by the system. Also, information interoperability may mean capability that two or more networks, systems, devices, applications, or components can efficiently share and easily use information without giving inconvenience to users.

'Inductive charging system': A system transferring energy from a power source to an EV through a two-part gapped core transformer in which the two halves of the transformer, primary and secondary coils are physically separated from one another. In the present disclosure, the inductive charging system may correspond to an EV power transfer system.

'Inductive coupler': The transformer formed by the coil in the GA Coil and the coil in the VA Coil that allows power to be transferred with galvanic isolation.

'Inductive coupling': Magnetic coupling between two coils. In the present disclosure, coupling between the GA Coil and the VA Coil.

'Ground assembly, GA': An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

'Vehicle assembly, VA': An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

'Primary device': An apparatus which provides the contactless coupling to the secondary device. That is, the primary device may be an apparatus external to an EV. When the EV is receiving power, the primary device may act as the source of the power to be transferred. The primary device may include the housing and all covers.

'Secondary device': An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

'GA controller': The portion of the GA which regulates the output power level to the GA Coil based on information from the vehicle.

'VA controller': The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

'Magnetic gap': The vertical distance between the plane of the higher of the top of the litz wire or the top of the magnetic material in the GA Coil to the plane of the lower of the bottom of the litz wire or the magnetic material in the VA Coil when aligned.

'Ambient temperature': The ground-level temperature of the air measured at the subsystem under consideration and not in direct sun light.

'Vehicle ground clearance': The vertical distance between the ground surface and the lowest part of the vehicle floor pan.

'Vehicle magnetic ground clearance': The vertical distance between the plane of the lower of the bottom of the litz wire or the magnetic material in the VA Coil mounted on a vehicle to the ground surface.

'VA Coil magnetic surface distance': the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

'Exposed conductive component': A conductive component of electrical equipment (e.g., an electric vehicle) that may be touched and which is not normally energized but which may become energized in case of a fault.

'Hazardous live component': A live component, which under certain conditions can give a harmful electric shock.

'Live component': Any conductor or conductive component intended to be electrically energized in normal use.

'Direct contact': Contact of persons with live components. (See IEC 61440)

'Indirect contact': Contact of persons with exposed, conductive, and energized components made live by an insulation failure. (See IEC 61140)

'Alignment': A process of finding the relative position of primary device to secondary device and/or finding the relative position of secondary device to primary device for the efficient power transfer that is specified. In the present disclosure, the alignment may direct to a fine positioning of the wireless power transfer system.

'Pairing': A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

'Command and control (C&C) communication': The communication between the EV supply equipment and the EV exchanges information necessary to start, control and terminate the process of WPT.

'High level communication (HLC)': HLC is a special kind of digital communication. HLC is necessary for additional services which are not covered by command & control communication. The data link of the HLC may use a power line communication (PLC), but it is not limited.

'Low power excitation (LPE)': LPE means a technique of activating the primary device for the fine positioning ad pairing so that the EV can detect the primary device, and vice versa.

Hereinafter, preferred exemplary embodiments according to the present disclosure will be explained in detail by referring to accompanying figures.

Figure 2:
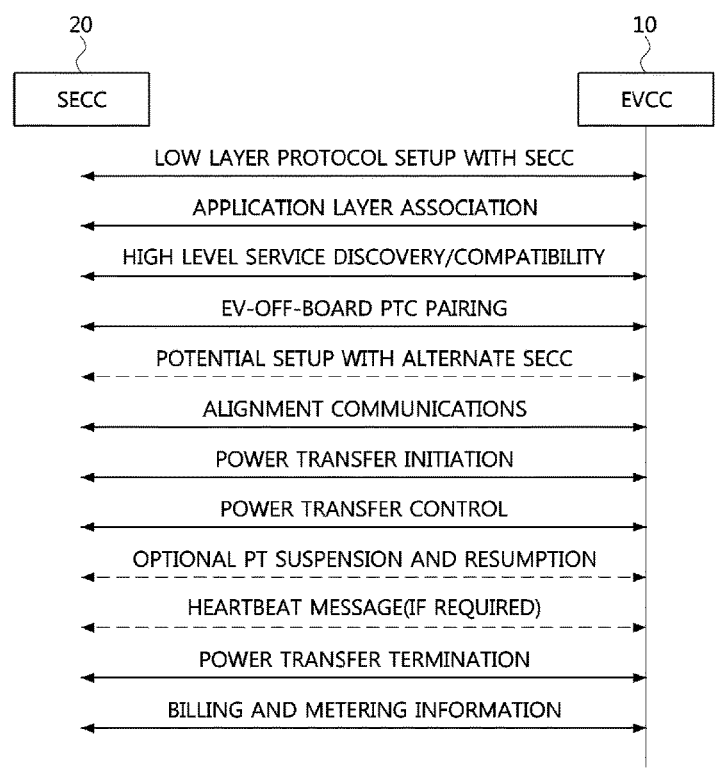
FIG. 2 is a sequence diagram explaining a flow of high-level messages for wireless charging in an EV charging system to which a primary device discovery method according to embodiments of the present disclosure is applied.

FIG. 2 is a sequence diagram explaining a flow of high-level messages for wireless charging in an EV charging system to which a primary device discovery method according to embodiments of the present disclosure is applied.

As shown in FIG. 2, an EV charging system using a primary device (PD) discovery method according to an embodiment may prepare wireless charging through message exchanges between an electric vehicle communication controller (EVCC) 10 and a supply equipment communication controller (SECC) 20, perform power transfer, and perform payment of charging fees (e.g., billing) after completion of the power transfer. Specifically, messages, such as a low layer protocol setup with SECC, an application layer association, a high level service discovery/compatibility, an EV off-board power transfer communication pairing, a potential setup with alternate SECC, alignment communications, power transfer initiation, power transfer control, optional power transfer suspension and resumption, heartbeat messages (if required), power transfer termination, and billing and metering information, may be used between the SECC 20 and the EVCC 10.

Here, in an EV charging system according to an embodiment, the EVCC 10 may automatically perform a pairing with a specific PD among a plurality of PDs located in a charging station. For example, in an initial pairing procedure for at least one of the above-described low layer protocol setup with SECC, application layer association, high level service discovery/compatibility, EV off-board power transfer communication pairing, or a combination of some of them, the EVCC 10 according to the present embodiment may efficiently select a specific PD suitable to it and perform a pairing with the selected PD by configuring a first wireless network using a common identifier, obtaining information on respective unique network identifiers of the plurality of PDs through the first wireless network, and receiving signals for configuration of respective wireless networks from the plurality of PDs each of which has a unique network identifier after releasing the first wireless network.

In embodiments of the present disclosure, the power transfer may include a conductive power transfer performed via a cable between the SECC 20 and the EVCC 10, and a wireless power transfer performed via a magnetic inductive coupling or a magnetic resonant coupling between two coils without direct contacts of cables.

Figure 3:
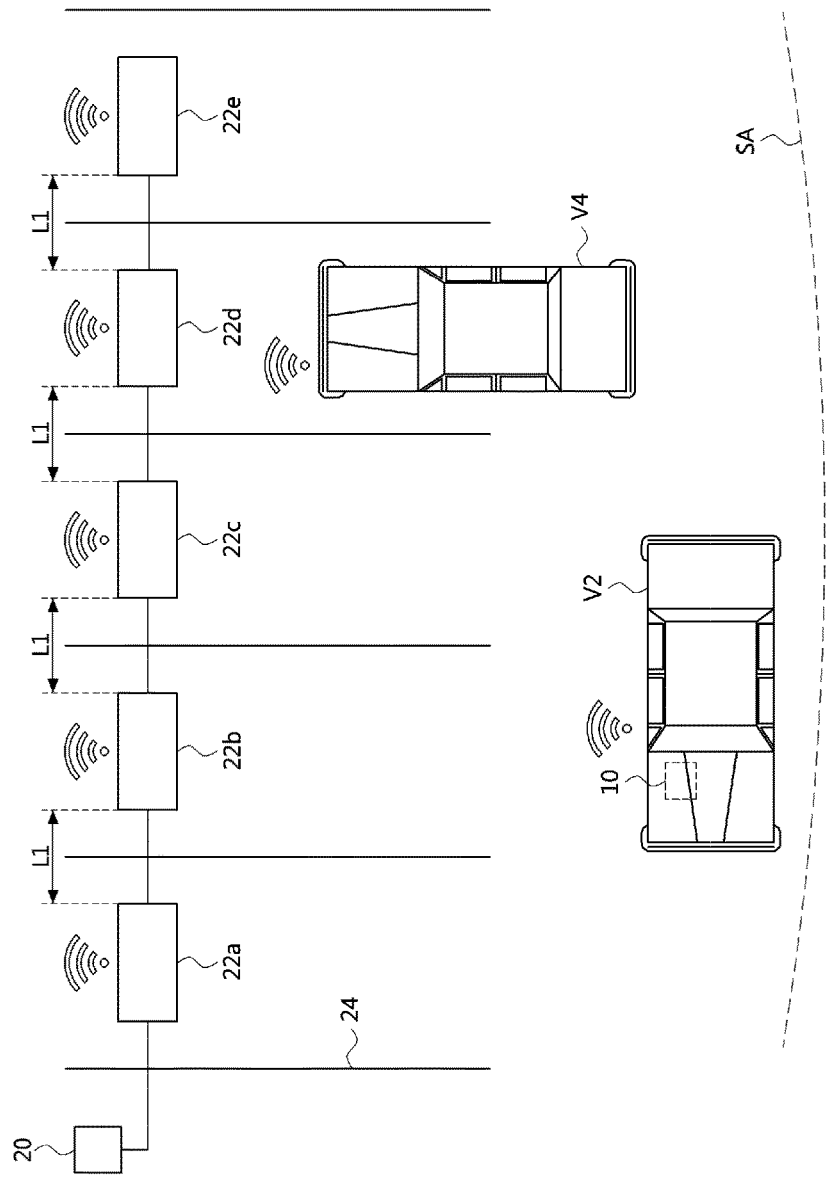
FIG. 3 is an exemplary view explaining an arrangement of a plurality of primary devices in a charging station of an EV charging system according to embodiments of the present disclosure.

FIG. 3 is an exemplary view explaining an arrangement of a plurality of primary devices in a charging station of an EV charging system according to embodiments of the present disclosure.

As shown in FIG. 3, an EV charging system according to an embodiment may comprise at least one electric vehicle supply equipment (EVSE), and the EVSE may comprise a supply equipment communication controller (SECC) 20 and a plurality of PDs 22a, 22b, 22c, 22d, and 22e. The plurality of PDs may be referred to as first to fifth PDs, and each PD may comprise an antenna for transceiving radio signals.

The SECC 20 may be an entity configured to perform communications with one or more electric vehicle communication controllers (EVCCs) according to a predetermined protocol, and interoperate with entities in a secondary side. Also, in the embodiment, the SECC 20 may communicate with EVCCs by using its own antenna and/or antennas of the plurality of PDs 22a to 22e, and control the EVCC of an EV entering into a service area of the charging station to select a specific PD through the communications, move to a proper position, or perform alignment.

In the charging station, the first PD 22a may be located in a position corresponding to a charging spot in a parking bay separated by lines 24. The first PD 22a may comprise an antenna for WLN communications (e.g., refer to 229 of FIG. 8) as connected to the SECC 20. Also, the first PD 22a may comprise a cable for command and control (C&C) communications (e.g., refer to 225 and 227 of FIG. 8) or an antenna for near-distance communications (e.g., refer to 223 of FIG. 8). Also, according to implementations, the first PD 22a may further comprise a primary device communication controller (e.g., refer to PDCC of FIG. 8).

Each of the second PD 22b, third PD 22c, fourth PD 22d, and fifth PD 22e may be practically identical to the first PD 22a except that each of them is located, with a predetermined gap, in a position corresponding to different charging spots of the charging station. For example, a distance L1 between adjacent PDs may be about 1.5 meter when considering widths of adjacent parking bays. The above value is just an example. That is, the value of L1 may vary according to widths of parking bays. However, it may be desirable that the value of distance L1 is set to a value a little larger than about 1.5 meter at which signal levels of adjacent PDs can have remarkable differences.

In the disclosure, each of the first to fifth PDs 22a to 22e may be configured to have two network identifiers including a first network identifier and a second network identifier. Here, the first network identifier is a network identifier commonly assigned to all of the PDs 22a to 22e, and may be referred to as a common identifier. Also, the second network identifier is a PD specific network identifier, and may be referred to as a unique identifier. The unique identifier may be a media access control (MAC) address or an internet protocol (IP) address of each primary device.

For example, the first network identifier for the first to fifth PDs 22a to 22e and the second network identifiers for them may be configured as shown in the following Table 1.

TABLE 1

|  | First network identifier | Second network identifier |
| --- | --- | --- |
| First PD | WCS_EVSE | 10-EF123456 |
| Second PD | WCS_EVSE | 78-AC123456 |
| Third PD | WCS_EVSE | BF-45123456 |
| Fourth PD | WCS_EVSE | 88-00123456 |
| Fifth PD | WCS_EVSE | F5-7E123456 |

As represented in the Table 1, the first to fifth PDs may have the same network identifier 'WCS_EVSE' as the first network identifier, and different network identifiers as respective second network identifiers. For example, the first PD may have '10-EF123456' as its second network identifier, the second PD may have '78-AC123456' as its second network identifier, the third PD may have 'BF-45123456' as its second network identifier, the fourth PD may have '88-00123456' as its second network identifier, and the fifth PD may have 'F5-7E123456' as its second network identifier.

According to the embodiment, the EVCC 10 of the EV V2 entering into a service area (SA) of the network of the charging station may activate the PDs 22a to 22e or activate the SECC 20 (or, its related function parts) by transmitting a beacon signal for low power operation, and perform configuration of a first wireless network and a second wireless network by using the first network identifier and the second network identifiers. Also, information on the unique identifiers (i.e., second network identifiers) of the plurality of PDs may be shared with all of the PDs when the first network is configured with the common identifier, whereby the EVCC 10 can efficiently discover a specific PD.

In other words, using a discover method according to an exemplary embodiment which will be explained later, the EVCC 10 of the EV V2 may discover a specific charging spot or a specific PD corresponding to the charging spot suitable to the EV V2 except the PD of the charging spot which is already occupied by another EV (e.g., V4). Especially, when the EVCC 10 attempts to discover the specific PD among the plurality of PDs corresponding to the plurality of charging spots arranged with a predetermined gap, the EVCC 10 can automatically perform configuration of initial communications with the specific PD, in spite of environmental influences or deviation in strengths of received wireless signals.

Meanwhile, although the SECC 20 and the plurality of PDs 22a to 22e were explained as located in a commercial charging station or a similar place in the above exemplary embodiment, various exemplary embodiments of the present disclosure are not restricted thereto. That is, they may also be used for various EV charging environments installed in facilities for family use, residence facilities, or various public places.

Figure 4:
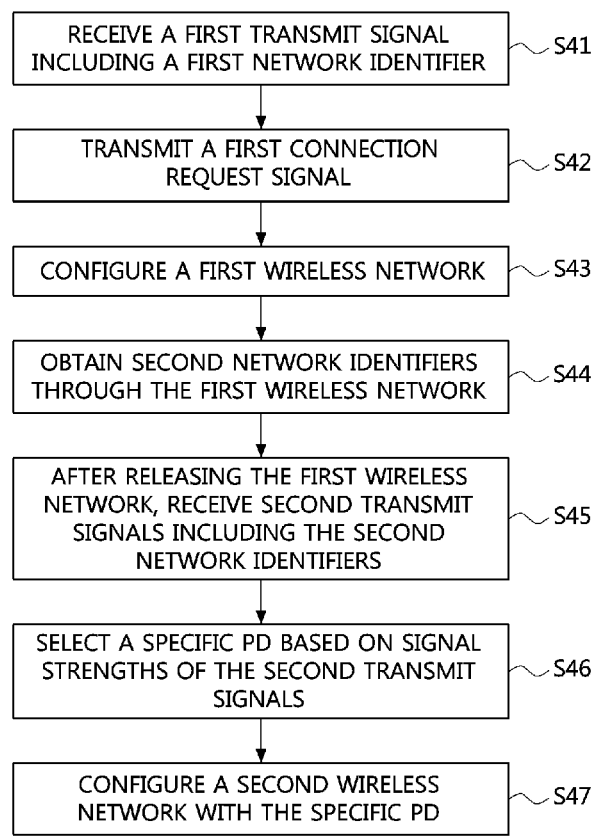
FIG. 4 is a flow chart explaining a method for discovering a specific primary device in a charging station of FIG. 3 performed by an EV.

FIG. 4 is a flow chart explaining a method for discovering a specific primary device in a charging station of FIG. 3 performed by an EV.

As shown in FIG. 4, a primary device discovery method according to an embodiment may be performed based on exchange of messages and data between the EVCC of the EV and the SECC of the charging station.

First, the EVCC may receive a first transmit signal including the first network identifier from the SECC (S41). As described above, the first network identifier is an identifier which is commonly assigned to the plurality of PDs managed by the SECC. The first transmit signal may be transmitted by the SECC when the SECC is activated by the beacon signal transmitted by the EV entering into the service area of the charging station. Also, the first transmit signal may be transmitted through an antenna directly connected to the SECC or at least one of the antennas in the plurality of PDs.

Then, the EVCC may transmit a first connection request signal to an address corresponding to the first network identifier included in the received first transmit signal (S42). The first connection request signal may include the second network identifiers for the EVCC in addition to the first network identifier.

Then, the EVCC may receive a response to the first connection request signal from the SECC, and configure the first wireless network for the SECC according to the received response (S43). The first wireless network may be a wireless personal area network (WPAN), or a wireless local area network (WLAN). Also, the WPAN may include ZigBee, Bluetooth, ultra wide band (UWB), etc. and the WLAN may include Wi-Fi, etc. However, various implementations are not restricted to the above examples.

Then, the EVCC may obtain the second network identifiers of the plurality of PDs managed by the SECC from the SECC through the first wireless network (S44). As described above, the second network identifiers are PD specific network identifiers assigned to the plurality of PDs managed by the SECC. The obtained information on the second network identifiers may be stored in a storage part connected to the EVCC.

After providing the EVCC with the information on the second network identifiers, the SECC may release the first wireless network, and start an operation mode (referred to as 'second operation mode') in which each PD operates based on its unique network identifier.

Then, after the release of the first wireless network and start of the operation mode, the EVCC may receive second transmit signals including the second network identifiers from the respective PDs of the SECC (S45). The second transmit signals received at the EVCC may have different signal strengths according to distances of the PDs and the EV.

Then, the EVCC may select a specific PD based on received signal strengths of the second transmit signals (S46). For example, the EVCC may select a PD corresponding to the highest signal level as the specific PD. Also, in order to enhance reliability of the selection, the specific PD may be selected based on an average value of received signal strengths of the second transmit signals received more than predetermined times (e.g., 10 times).

Then, the EVCC may configure a second wireless network for the selected specific PD by using the second network identifier of the selected specific PD (S47). The configuration of the second wireless network may be performed based on a procedure in which the EVCC transmits a second connection request signal to an address corresponding to the second network identifier of the specific PD, and receives a response to the second connection request signal from the SECC.

Meanwhile, although it was not considered that the PD comprises the PDCC in the above-described exemplary embodiment, the EVCC may also configure the second wireless network through direction communications with the PDCC if the PDCC exists.

Figure 5:
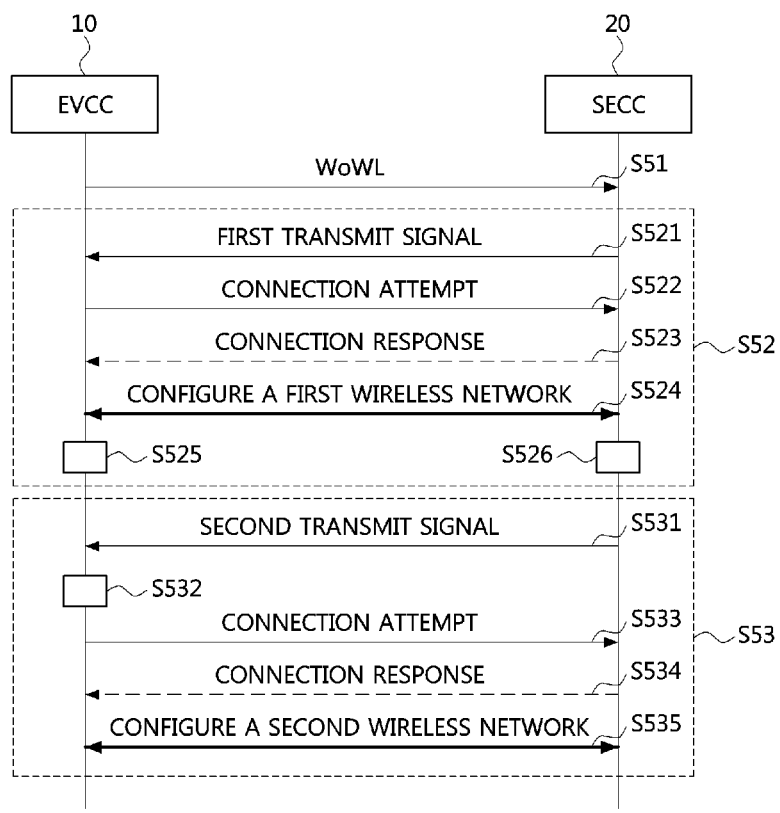
FIG. 5 is a sequence diagram explaining a primary device discovery method of FIG. 4.

FIG. 5 is a sequence diagram explaining a primary device discovery method of FIG. 4.

As shown in FIG. 5, a primary device discovery method according to an embodiment may be started when the EVCC 10 of the EV transmits a wake on wireless LAN (WoWL) signal for starting an EV charging process to the SECC 20 of the charging station or the plurality of PDs managed by the SECC 20 after the EV enters into a network area provided by the charging station or a similar infrastructure (S51).

Here, in the step S51, the SECC 20 in stand-by state may detect the EV entering into the charging station by using its own sensors, and be activated according to the detected event. Alternatively, the SECC 20 may be already in activated state when the EV enters into the charging station.

The primary device discovery method according to the embodiment may basically include a sharing step S52 in which the first wireless network is configured and a discovery step S53 in which the second wireless network is configured after release of the first wireless network.

In embodiments of the present disclosure, the sharing step S52 is performed for resolving a problem that it is not so easy for the moving EV to access the near-distance wireless networks of the SECC and PDCC of the charging station by using the network identifier of the specific PD when the near-distance wireless networks of the SECC and PDCC use different network identifiers (e.g., SSIDs).

That is, through the sharing step S52, the EV entering into the network service area of the charging station may automatically access a wireless network suitable to it (i.e., the second wireless network) among wireless networks by selectively identifying the second network identifier uniquely assigned to the specific PD of the charging spots.

In further detail, the sharing step S52 may comprise a step S521 in which the EVCC 10 receives the first transmit signal from the SECC 20, a step S522 in which the EVCC 10 attempts a connection with the SECC 20 in order to configure the first wireless network based on the common identifier included in the first transmit signal, a step S523 in which the EVCC 10 receives a response regarding the connection from the SECC 20, and a step S524 in which the EVCC 10 configures the first wireless network with the SECC 20.

Here, the common identifier is an identifier (the first network identifier) which is assigned commonly to all of the PDs belonging to the charging station and managed by the SECC 20. Also, the first wireless network may be a near-distance wireless network such as Wi-Fi.

Also, in the sharing step S52, the EVCC 10 may receive unique network identifiers of the plurality of PDs from the SECC 20 through the first wireless network, and store them in a storage part connected to the EVCC 10. The unique network identifiers (the second network identifiers) are network identifiers which are uniquely assigned to the respective PDs. The unique network identifiers may be MAC addresses and/or IP addresses of the respective PDs. However, various embodiments are not restricted thereto. Accordingly, each PD may be designated by the common identifier and its unique identifier.

Also, in the sharing step S52, the SECC 20 may provide the EVCC 10 with the unique network identifiers, and control all of the PDs to transmit wireless signals (i.e., the second transmit signals) including their unique network identifiers with a predetermined transmission power.

Then, the discovery step S53 may comprise a step S531 in which the EVCC 10 receives the wireless signals (i.e., the second transmit signals) transmitted by all of the PDs after releasing the first wireless network, a step S532 in which a specific PD is selected based on received signal strengths of the second transmit signals, a step S533 in which the EVCC 10 attempts a connection for configuration of the second wireless network with the SECC 20 or the PDCC of the specific PD by using the unique network identifier included in the second transmit signal of the selected specific PD, a step S534 in which the EVCC 10 receives a response to the connection attempt from the SECC 20 or the PDCC of the specific PD, and a step S535 in which the EVCC 10 configures the second wireless network with the SECC 20 or the PDCC of the specific PD.

Figure 6:
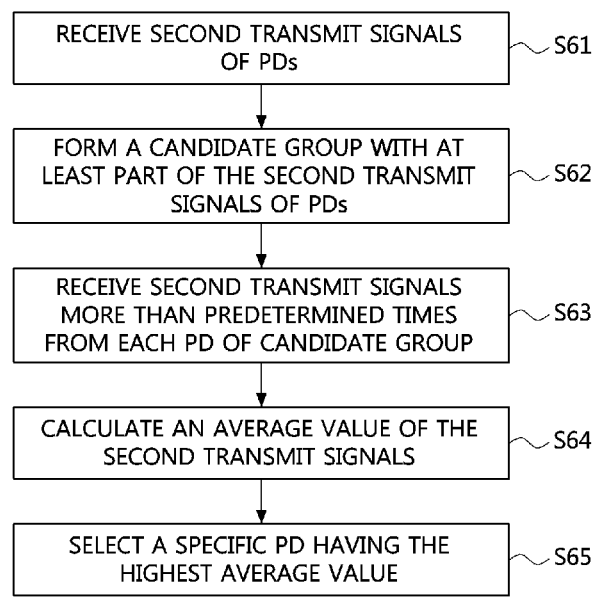
FIG. 6 is a detail flow chart explaining a partial procedure of a primary device discovery method according to embodiments of the present disclosure.

FIG. 6 is a detail flow chart explaining a partial procedure of a primary device discovery method according to embodiments of the present disclosure.

As shown in FIG. 6, a primary device discovery method according to an embodiment may further comprise the following sub steps in the step S532 for selecting the specific PD of FIG. 5.

First, the EVCC 10 may receive the second transmit signals from all of the PDs (S61), and select the second transmit signals of some of the PDs as a candidate group (S62).

In the step S62, the EVCC 10 may form the candidate group by comparing received signal strengths of the second transmit signals received from all of the PDs and selecting some of them based on the information on the unique network identifiers of the PDs obtained through the first wireless network configured before the step S61. Here, adjacent PDs among the plurality of PDs may be located with a predetermined gap (e.g., about 1.5 meter). Such the grouping procedure is to narrow down a range of PDs suitable to charging of the EV, and also efficient for reducing data processing amount in the steps S63 and S64, which are performed for enhancing accuracy and reliability and will be explained later.

Then, the EVCC 10 may receive wireless signals more than predetermined times from each PD belonging to the candidate group (S63). For example, in this step, the EVCC 10 may receive wireless signals of each PD belonging to the candidate group ten times for a predetermined time duration.

Then, the EVCC 10 may calculate an average value of received signal strengths of the wireless signals (i.e., received signals) of each PD belonging to the candidate group (S64). Using the average value of the received signal strengths, deviation in the received signal strengths due to environmental changes can be compensated, whereby the discovery based on the received signal strengths can be performed reliably.

Then, the EVCC 10 may select a specific PD having the highest average value of received signal strengths as a pairing target for charging of the EV (S65).

Figure 7:
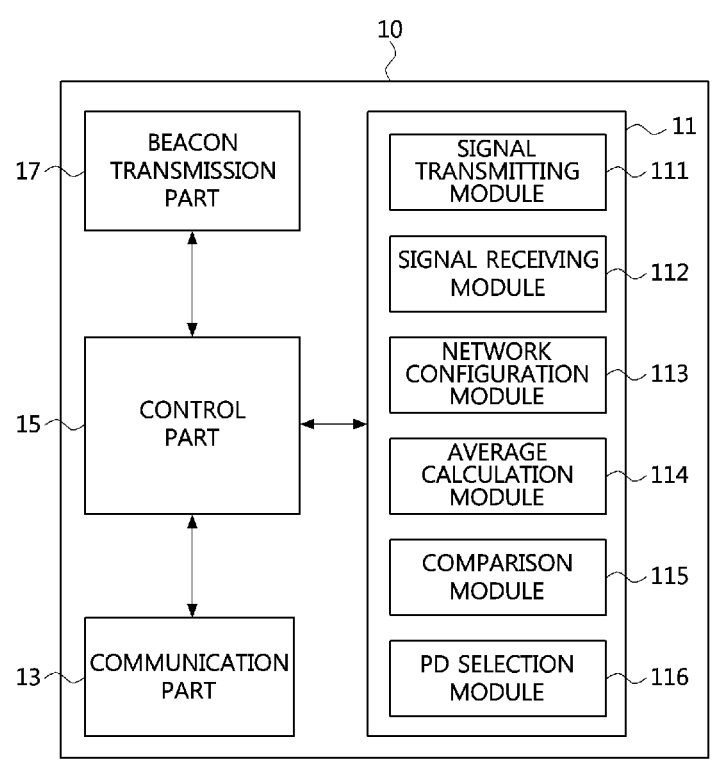
FIG. 7 is a block diagram of a primary device discovery apparatus according to embodiments of the present disclosure.

FIG. 7 is a block diagram of a primary device discovery apparatus according to embodiments of the present disclosure.

As shown in FIG. 7, a primary device discovery apparatus according to an embodiment 10 may comprise a storage part 11, a communication part 13, a control part 15, and a beacon signal transmission part 17.

More specifically, the storage part 11 may further comprise a signal receiving module 111, a signal transmitting module 112, a network configuration module 113, an average calculation module 114, a comparison module 115, and a PD selection module 116. Each module or a combination of the modules may be controlled by the control part 15 to perform its function.

For example, the signal receiving module 111 may operate to receive, at the EVCC of the EV, the first transmit signal including the first network identifier (i.e., the common identifier) from the charging station. Also, the signal receiving module 111 may operate to receive the second transmit signals which respectively include the second network identifiers (i.e., the unique identifiers) of the all of the PDs of the SECC of the charging station. Also, the signal receiving module 111 may operate to receive commands or signals (e.g., control signals and/or data transmission/reception signals) for configuration of wireless networks, pairing, alignment, and charging of the EV from the SECC or the PDs.

The signal transmitting module 112 may operate to transmit, at the EVCC, the first connection request signal to the SECC of the charging station. The signal transmitting module 112 may operate to transmit, at the EVCC, the second connection request signal to a specific PD of the SECC. Also, the signal transmitting module 112 may operate to transmit commands or signals (e.g., control signals and/or data transmission/reception signals) for configuration of wireless networks, pairing, alignment, and charging of the EV to the SECC or the PDs.

At least part of components of the signal receiving module 111 and the signal transmitting module 112 may be shared.

The network configuration module 113 may configure a wireless network between the EVCC and the SECC or between the EVCC and the PDCC of the specific PD according to C&C communications or high-level communications through the signal reception module 111 and the signal transmitting module 112. Here, the configuration of the wireless network may include a network configuration for a PD discovery, alignment for wireless power transfer, pairing, charging of the EV, or their combination.

The average value calculation module 114 may calculate an average value of signal strengths of signals received more than predetermined times from each PD belonging to the candidate group. Through the average value calculation module 114, the efficiency and performance of the discovery apparatus can be enhanced by narrowing down a range of discover targets, increasing the number of signal strength measurements for the restricted discovery targets, and using the calculated average value. The comparison module 115 may be used to select a specific PD having the highest signal level by comparing average values of received signal strengths of PDs belonging to the candidate group obtained from the average value calculation module 114. The above-described average value calculation module 114 and comparison module 115 may be referred to as a calculation module having a combinational form of the two modules.

According to the comparison result of the comparison module 115, the PD selection module 116 may select the specific PD as a charging entity for the EV. The PD selection module 116 may include a function of configuring the second wireless network with the specific PD or the SECC managing the specific PD based on the unique network identifier of the specific PD.

The above-described modules in the storage part 11 may have a form of software, program, a set of instructions, or a combination of them for efficiently discovering a specific PD in an EVSE.

Also, in an embodiment, the storage part 11 may further comprise other modules necessary for EV charging in addition to the above-described modules. That is, the storage part 11 may further comprise a pairing module, an EV charging initiation module, an EV charging control module, and an EV charging termination module. Also, in addition to the basic modules 111 to 116, the storage part 11 may further comprise an operating system (OS) module, a command and control module for EV charging, a power line communication (PLC) control module, a communication module, a graphic module, a user interface module, a camera module, at least one application module, a fee charging module, or a combination of them. The module may be understood as a set of instructions or a program.

Here, the OS may include 'CarPlay' of Apple, 'Windows in the Car' of Microsoft, or 'Automotive Solution' of Nvidia. However, various implementations are not restricted thereto. That is, various OSs for conventional computing devices or mobile devices, such as Microsoft Windows, Linux, Darwin, RTXC, Unix, OS X, iOS, Mac OS, VxWorks, Google Andriod, or plan 9, may be used as the OS. The above-described OS may have a function for communications between various hardware and software components (modules).

The storage part 11 may include a high-speed random access memory such as a magnetic disk storage device and/or a non-volatile memory, at least one optical storage device and/or flash memory.

The communication part 13 may connect the primary device discovery apparatus 10 to the SECC of EVSE, the PDCC of the SECC, or other apparatuses (equipped with communication means) in the network through the network. The communication part 13 may include at least one wire and/or wireless communication subsystem supporting at least one communication protocol. The wireless communication subsystem may include a radio frequency (RF) receiver, a RF transmitter, a RF transceiver, an optical (e.g., infra-red) received, an optical transmitter, an optical transceiver, or a combination of them.

Here, although the wireless network may basically mean Wi-Fi, various embodiments are not restricted thereto. The communication part 13 of the embodiment may support various wireless networks such as Global System for Mobile Communication (GSM), Enhanced Data GSM Environment (EDGE), Code Division Multiple Access (CDMA), W-Code Division Multiple Access (W-CDMA), Long Term Evolution (LTE), LET-Advanced (LTE-A), Orthogonal Frequency Division Multiple Access (OFMDA), WiMax, or Bluetooth.

In various embodiments of the present disclosure, the above-described control part 15 may be implemented by using a processor or a microprocessor, as explained hereinabove. The control part 15 may include at least one core and a cache memory. In case that the control part 15 has a multi-core architecture, the multi-core architecture may be a single package comprising integrated circuits, into which two or more independent cores are integrated. Also, in case that the control part 15 has a single-core architecture, the single core may be a central processing unit (CPU). The CPU may be implemented as a system on chip (SoC) into which a micro control unit and various peripheral devices (or, integrated circuitry for external peripheral devices) are integrated. However, various embodiments are not limited to the above examples. Here, the core may include registers storing instructions to be executed, an arithmetic logical unit (ALU) performing comparison, determination, and operations, a control unit controlling the CPU for interpretation and execution of the instructions, an internal bus, etc.

Also, the control part 15 may include at least one of a data processor and an image processor, or a combination of them. The control part 15 may include at least one electronic control unit (ECU) installed within a vehicle. Also, the control part 15 may comprise a peripheral interface and a memory interface. In this case, the peripheral interface may connect the control part 15 to an input/output system and other peripheral devices (e.g., communication part, beacon signal transmission part, etc.), and the memory interface may connect the control part 15 to the storage part 11.

The above-described control part 15 may perform data input, data processing, and data output through C&C communications or high-level communications in order to perform a primacy device discover method by executing various software programs stored in the storage part 11. Also, the control part 15 may perform various functions of the corresponding modules by executing respective software modules (instruction sets) stored in the storage part 11. For example, the control part 15 can enable the EV to efficiently discover a specific PD located in a specific charging spot through a primary device discovery method performed by the software modules 111 to 116 stored in the storage part 11.

For efficient discovery of the specific PD in the EVSE of the charging station, the control part 15 may access the SECC of the EVSE by using the common network identifier, receive and store the unique network identifiers of all the PDs in the EVSE, receive wireless signals of at least part of all the PDs of the SECC, and select the specific PD for charging of the EV based on received signal strengths of the wireless signals of the at least part of all the PDs.

The beacon signal transmission part 17, as an optional component, may comprise a means for transmitting a signal activating the PDCC or SECC by the EV, or a part performing a function corresponding to the means. The signal transmitted by the beacon signal transmission part 17 may be a wake on wireless LAN (WoWL) signal. However, various embodiments are not restricted thereto. That is, any type of signal, which can be used by the EV to activate the SECC or PDCC, or can be used by the SECC or PDCC to activate at least part of functions (e.g., primary device discovery functions, etc.) of the EVCC of the EV, may be used as the signal transmitted by the beacon signal transmission part 17.

Meanwhile, in an embodiment, the components 111 to 1116 of the primary device discovery apparatus may be functional blocks or modules of an controller installed in the EV or ECU, without being restricted thereto. The above-described components may be implemented to operate in a ECU of the EV, as stored in a computer readable medium in a software form for implementing predetermined functions (at least part of the primary device discovery method), or transmitted to a remote site in a carrier form. Here, the computer readable medium may be connected to a plurality of computing apparatuses or a cloud system which are connected through a network, and at least one of the plurality of computing apparatuses and the cloud system may store source code, intermediate code, or executable code for performing the magnetic field alignment method according to the present disclosure in the storage means of the magnetic field alignment apparatus according to the present disclosure.

The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

Figure 8:
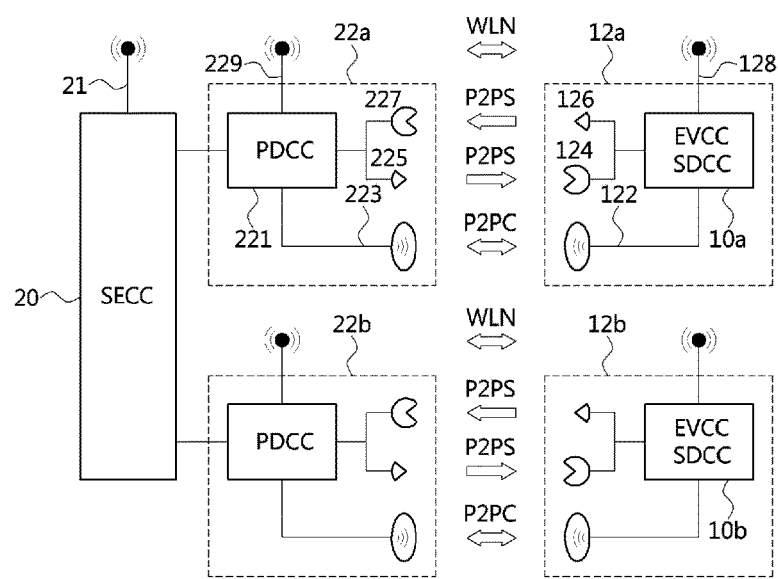
FIG. 8 is a conceptual view explaining a communication subsystem in an EV charging system architecture having a SECC according to embodiments of the present disclosure.

FIG. 8 is a conceptual view explaining a communication subsystem in an EV charging system architecture having a SECC according to embodiments of the present disclosure.

As shown in FIG. 8, in an EV charging system according to an embodiment, interoperation between the EVSE and EV may be performed through C&C communications or HLC which is an optional configuration.

In the wireless power transfer process, critical steps such as initiation of wireless power transfer, termination of wireless power transfer, or safety related functions may be managed through the C&C communications. Also, the EVSE and EV may use HLC in order to exchange additional parameters (e.g., charging profile information, charging fee information, etc.) for wireless power transfer between them.

In a wireless power transfer system or EV charging system, the EVSE may be a place holder for all devices installed in infrastructure side, and the EV may be a place holder for all devices installed in the EV.

For example, the EVSE may include the SECC 20, and the SECC 20 may comprise a SECC antenna 21 and one or more PDs. In the embodiment, there are the first PD 22a and the second PD 22b having the practically same structure, and the first PD 22a may comprise the PDCC 221. The PDCC 221 may comprise a PDCC antenna 223, a PDCC signaler 225, a PDCC detector 227, and a PDCC WLN antenna 229.

Also, the PD discovery apparatus may be configured to store program modules (e.g., refer to 111 to 116 of FIG. 7)

in the storage part of the EVCC (e.g., refer to 10 of FIG. 3 and FIG. 5), and execute the program modules to discover a specific PD (e.g., refer to 10 of FIG. 7). In this case, the EVCC 10a existing in the PD discovery apparatus may be configured to communicate with the SECC 20 or the PDCCs 22a and 22b connected to the SECC 20.

Here, the SECC 20 and the PDCC may be implemented as a single hardware component. Similarly, the EVCC 10a may include a secondary device communication controller (SDCC) of the EV, and may be implemented as a single hardware component with the SDCC.

The EVCC or SDCC 10a may comprise a SDCC antenna 122, a SDCC detector 124, a SDCC signaler 126, and a SDCC WLN antenna 128 for communications with the SECC 20 and/or PDCCs 22a and 22b.

Also, in the embodiment, a PD discovery apparatus of another EV may comprise another EVCC 10b having the practically same structure as that of the above-described EVCC 10a. Also, the above-described EVCC 10a may be implemented in at least one electronic control unit 12a. Similarly, the above-described EVCC 10b may be implemented in at least one electronic control unit 12b.

Through the above-described configuration, the EVSE and the EV may perform communications for PD discovery, pairing, alignment, fine alignment, EV charging, etc. through peer-to-peer signaling (P2PS), peer-to-peer communications (P2PC), wireless local network (WLN), or a combination of them.

Meanwhile, although the communications between SECC and EVCC and the communications between PDCCs and EVCC were explained as being used together in the embodiment, various embodiments are not restricted thereto. That is, according to an exemplary embodiment, almost the whole of the PD discovery procedure may be performed through communications between at least one PDCC and the EVCC. Furthermore, even only one of the WLN, P2PS, P2PC, or the combination of them may be used for performing the PD discovery procedure. In addition, in a case that a coordinator which is connected to the SECC 20 and other SECCs and controls or coordinates them is used, it may become possible that the EVSE of the charging station comprises a plurality of SECCs.

Figure 9:
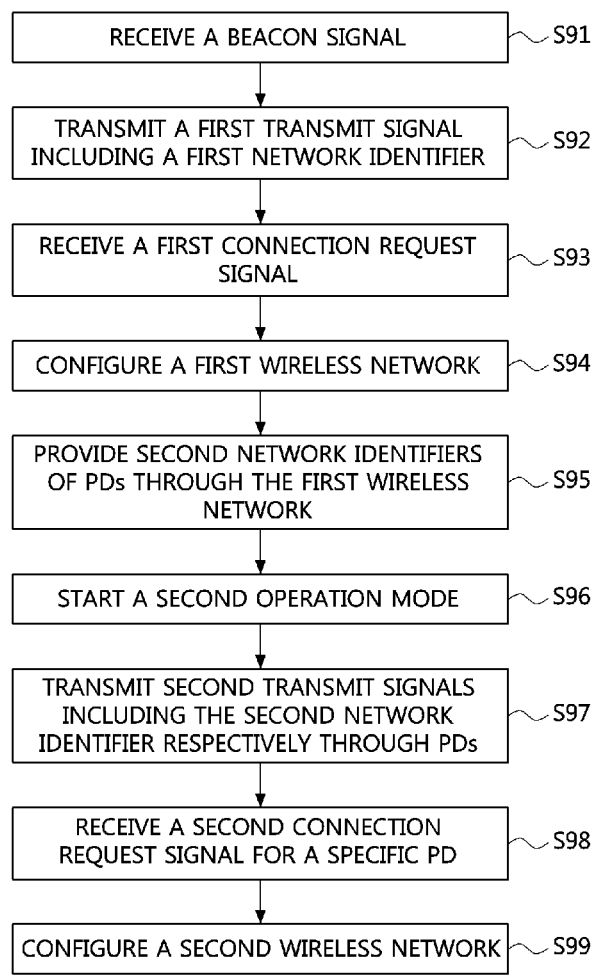
FIG. 9 is a flow chart explaining an operation method of a supply equipment communication controller according to embodiments of the present disclosure.

FIG. 9 is a flow chart explaining an operation method of a supply equipment communication controller according to embodiments of the present disclosure.

As shown in FIG. 9, an operation method of a SECC according to an embodiment may be started when a beacon signal transmitted from an EV is received (S91). Upon receiving the beacon signal, the SECC may be activated, and start a procedure for connecting a wireless network with the EV.

Then, the SECC may transmit a signal including the first network identifier (i.e., the first transmit signal) (S92). The first transmit signal may be transmitted through PDCC antennas of a plurality of PDs managed by the SECC. The first transmit signal may include the first network identifier, the common identifier assigned to the plurality of PDs.

Then, the SECC may receive a network connection request based on the first network identifier (i.e., the first connectional request) from an EV receiving the first transmit signal (S93). Here, the SECC may transmit a response to the first connection request to the EVCC of the EV. However, the response may be omitted according to various embodiments.

Then, in response to the first connection request, the SECC may configure a first wireless network with the EVCC (S94). Since the first wireless network uses a single network identifier (i.e., the first network identifier) for all of the PDs in the charging station, EVs entering into a network area of the charging station may configure initial communications for EV charging with the EVSE of the charging station in the reliable and rapid manner.

Then, the SECC may provide the EVs with information on the second network identifiers of respective PDs through the first wireless network (S95). According to various implementations, the EVCC of the EV may automatically retrieve information on the second network identifiers stored in a storage part of the SECC through the first wireless network. Here, the information on the second network identifier may be a set of the second network identifiers each of which is uniquely assigned to each PD. If the second network identifiers are provided to the EVCC, the SECC may assign a network address for each EV to each PD. Here, the network address may include an internet protocol (IP) address.

Also, the SECC may further provide information on predetermined strengths of transmit signals of all of the PDs to the EVCC when the first wireless network is configured.

Then, the SECC may release the first wireless network and start an operation mode for configuring a second wireless network (S96). The operation mode for configuring the second wireless network may be performed as a soft access point mode operating in software manner without a physical operation stop. If the operation mode starts, each PD may be reconfigured with its unique second network identifier.

Then, the SECC or the plurality of PDCCs connected to the SECC may transmit signals including respective second network identifiers (i.e., the second transmit signals) through the plurality of PDCCs. Although the second transmit signal may include information on its transmission strength, embodiments are not restricted thereto.

Then, the SECC or a specific PDCC may receive a network connection request (i.e., the second connection request) for the specific PD from the EVCC (S98). The second connection request may include an attempt to establish a network connection with the specific PD selected by the EVCC based on received signal strengths of the second transmit signals of the plurality of PDs. Here, the SECC or the specific PDCC may provide the EVCC with a response to the second connection request. However, various embodiments are not restricted thereto.

Then, in response to the second connection request, the SECC may configure the second wireless network with the EVCC by establishing a channel between the SECC and the EVCC (S99). After the second wireless network is configured, the SECC may control movement for EV charging, fine alignment, pairing, initiation of charging, charging control, monitoring of charging, termination of charging, etc. through communications with the EVCC.

While the embodiments of the present disclosure and their advantages have been described in detail herein, it should be understood that various changes, substitutions and alterations may be made herein without departing from the scope of the disclosure.

What is claimed is:

1. A method for discovering a specific primary device (PD) of an electric vehicle supply equipment (EVSE), performed by a discovery apparatus of an electric vehicle (EV) including an electric vehicle communication controller (EVCC), the method comprising:

receiving a first transmit signal including a first network identifier from at least one of a supply equipment communication controller (SECC) of a charging station into which the EV enters and a plurality of PDs which are managed by the SECC and respectively located in positions corresponding to a plurality of charging spots of the charging station;

transmitting a first connection request signal based on the first network identifier to the SECC;

after receiving a first response to the first connection request signal from the SECC, configuring a first wireless network with the SECC;

receiving information relating to second network identifiers for the plurality of PDs from the SECC through the first wireless network;

receiving second transmit signals including the second network identifiers from the plurality of PDs when the first wireless network is released;

selecting a specific PD among the plurality of PDs based on received signal strengths of the second transmit signals; and configuring a second wireless network with the specific PD, wherein the first network identifier includes a common identifier which is commonly assigned to the plurality of PDs, the second network identifiers are unique identifiers which are uniquely assigned to each of the plurality of PDs, the receiving of the second transmit signals comprises:
  forming a candidate group with at least one PD among the plurality of PDs whose second transmit signal has a received signal strength greater than or equal to a reference value; and
  receiving second transmit signals more than a predetermined number of times respectively from the at least one PD constituting the candidate group, and
  the specific PD is selected from the candidate group based on average values of signal strengths of the second transmit signals received more than the predetermined number of times.

2. The method according to claim 1, further comprising:
after the specific PD is selected, transmitting a second connection request signal for the specific PD to the SECC; and
receiving a second response to the second connection request signal from the SECC.

3. The method according to claim 1, wherein the plurality of PDs includes primary coils and antennas respectively, and adjacent antennas among the antennas are positioned with a predetermined gap therebetween.

4. The method according to claim 1, further comprising:
before receiving the first transmit signal, transmitting a beacon signal for turning on the SECC or waking the SECC from a power saving mode.

5. An apparatus for discovering a primary device (PD) of an electric vehicle supply equipment (EVSE) which is installed in an electric vehicle (EV), the apparatus comprising:
  a communication part communicating with a supply equipment communication controller (SECC) of a charging station into which the EV enters; and
  a control part controlling the communication part, wherein the control part is configured to:
    receive a first transmit signal including a first network identifier from at least one of a supply equipment communication controller (SECC) of the charging station and a plurality of PDs which are managed by the SECC and are respectively located in positions corresponding to a plurality of charging spots of the charging station;
    transmit, to the SECC, a first connection request signal based on the first network identifier;
    after receiving a first response to the first connection request signal from the SECC, configure a first wireless network with the SECC;
    receive information relating to second network identifiers for the plurality of PDs from the SECC through the first wireless network;
    receive second transmit signals including the second network identifiers from the plurality of PDs when the first wireless network is released;
    select a specific PD among the plurality of PDs based on received signal strengths of the second transmit signals; and
    configure a second wireless network with the specific PD,
  the first network identifier includes a common identifier which is commonly assigned to the plurality of PDs,
  the second network identifiers are unique identifiers which are uniquely assigned to each of the plurality of PDs,
  when the second transmit signals are received, the control part is further configured to form a candidate group with at least one PD among the plurality of PDs whose second transmit signal has a received signal strength greater than or equal to a reference value, and to receive second transmit signals more than a predetermined number of times respectively from the at least one PDs constituting the candidate group, and
  the specific PD is selected from the candidate group based on average values of signal strengths of the second transmit signals received more than the predetermined number of times.

6. The apparatus according to claim 5, wherein the control part is further configured to, after the specific PD is selected and before the second wireless network is configured, transmit a second connection request signal for the specific PD to the SECC, and to receive a second response to the second connection request signal from the SECC.

7. The apparatus according to claim 6, wherein the plurality of PDs includes primary coils and antennas respectively, and adjacent antennas among the antennas are positioned with a predetermined gap therebetween.

8. The apparatus according to claim 5, further comprising a beacon transmission part connected to the control part,
  wherein the control part is further configured to control the beacon transmission part so as to transmit a beacon signal for turning on the SECC or waking the SECC from a power saving mode before receiving the first transmit signal.

9. An operation method of a supply equipment communication controller (SECC) of an electric vehicle supply equipment (EVSE), the method comprising:
  transmitting a signal including a first network identifier through an antenna connected to the SECC or at least one antenna connected to at least one of a plurality of primary devices (PDs) managed by the SECC;
  receiving a first connection request signal including the first network identifier from an electric vehicle communication controller (EVCC) of an electric vehicle (EV);
  after receiving the first connection request signal, configuring a first wireless network with the EVCC;
  providing the EVCC with information relating to second network identifiers of the plurality of PDs through the first wireless network;

changing operation modes of the plurality of PDs from a first operation mode based on the first network identifier to a second operation mode based on the second network identifiers;

transmitting signals including the second network identifiers respectively through antennas connected to the plurality of PDs;

receiving, from the EVCC, a second connection request signal including a second network identifier of a specific PD among the plurality of PDs; and after receiving the second connection request signal, configuring a second wireless network between the specific PD and the EVCC, wherein the first network identifier includes a common identifier which is commonly assigned to the plurality of PDs, the second network identifiers are unique identifiers which are uniquely assigned to each of the plurality of PDs, a candidate group is formed with at least one PD among the plurality of PDs whose transmitted signals have a received signal strength greater than or equal to a reference value, the at least one PD constituting the candidate group is configured to transmit the signals, respectively, more than a predetermined number of times, and the specific PD is selected from the candidate group based on average values of signal strengths of the signals transmitted more than the predetermined number of times.

10. The operation method according to claim 9, wherein the second network identifiers are media access control (MAC) addresses or internet protocol (IP) addresses of the plurality of PDs.

11. The operation method according to claim 9, wherein the plurality of PDs includes primary coils and antennas respectively, and adjacent antennas among the antennas are positioned with a predetermined gap therebetween.

12. The operation method according to claim 9, further comprising:

before transmitting the signal including the first network identifier, receiving, from the EVCC, a beacon signal for turning on the SECC or waking the SECC from a power saving mode.

* * * * *